United States Patent
LiPiShan et al.

(10) Patent No.: US 11,542,383 B2
(45) Date of Patent: Jan. 3, 2023

(54) FILLED POLYMER-BASED COMPOSITIONS WITH LOW VISCOSITY, GOOD MECHANICAL PROPERTIES AND ADHESION

(71) Applicant: Dow Global Technologies LLC, Midland, MI (US)

(72) Inventors: Colin LiPiShan, Pearland, TX (US); Kyle Anderson, Houston, TX (US)

(73) Assignee: Dow Global Technologies LLC, Midland, MI (US)

( * ) Notice: Subject to any disclaimer, the term of this patent is extended or adjusted under 35 U.S.C. 154(b) by 232 days.

(21) Appl. No.: 16/782,529

(22) Filed: Feb. 5, 2020

(65) Prior Publication Data
US 2020/0172700 A1  Jun. 4, 2020

Related U.S. Application Data

(63) Continuation of application No. 15/574,272, filed as application No. PCT/US2016/038307 on Jun. 20, 2016, now abandoned.

(60) Provisional application No. 62/184,087, filed on Jun. 24, 2015.

(51) Int. Cl.
| | |
|---|---|
| *C08K 3/34* | (2006.01) |
| *C08K 3/00* | (2018.01) |
| *C08K 3/26* | (2006.01) |
| *C08K 11/00* | (2006.01) |
| *C08L 23/26* | (2006.01) |
| *C08L 23/08* | (2006.01) |

(52) U.S. Cl.
CPC ............. *C08K 3/34* (2013.01); *C08K 3/00* (2013.01); *C08K 3/26* (2013.01); *C08K 11/00* (2013.01); *C08L 23/0815* (2013.01); *C08L 23/26* (2013.01); *C08K 2003/265* (2013.01); *C08L 2205/025* (2013.01)

(58) Field of Classification Search
CPC ... C08K 3/34; C08K 3/00; C08K 3/26; C08K 11/00; C08L 23/26; C08L 23/08
USPC ........................................................ 524/65
See application file for complete search history.

(56) References Cited

U.S. PATENT DOCUMENTS

| | | |
|---|---|---|
| 3,963,850 A | 6/1976 | Doss et al. |
| 6,214,924 B1 | 4/2001 | Bieser et al. |
| 7,335,696 B2 | 2/2008 | Yalvac et al. |
| 7,550,528 B2 | 6/2009 | Abhari et al. |
| 7,781,510 B2 | 8/2010 | Yalvac et al. |
| 2003/0096109 A1* | 5/2003 | Yanagiuchi .......... C09D 175/04 428/354 |
| 2008/0306217 A1 | 12/2008 | Karjala et al. |
| 2009/0202847 A1 | 8/2009 | Eberhardt et al. |
| 2010/0160497 A1* | 6/2010 | Karjala ..................... C08J 5/00 524/13 |
| 2015/0166853 A1 | 6/2015 | Chen et al. |
| 2015/0361315 A1 | 12/2015 | Karjala et al. |
| 2016/0304650 A1 | 10/2016 | Read et al. |
| 2017/0292045 A1 | 10/2017 | Chen et al. |

FOREIGN PATENT DOCUMENTS

| | | | |
|---|---|---|---|
| JP | H0578589 A | 3/1993 | |
| JP | H09286878 A | 11/1997 | |
| WO | 9838245 A1 | 9/1998 | |
| WO | WO-9838245 A1 * | 9/1998 | .......... C08L 23/0815 |
| WO | 2004035680 A1 | 4/2004 | |
| WO | 2015013472 A1 | 1/2015 | |
| WO | 2015100349 A1 | 7/2015 | |
| WO | 2016026121 A1 | 2/2016 | |

OTHER PUBLICATIONS

PCT/US2016/038307, International Search Report and Written Opinion, dated Aug. 16, 2016.
PCT/US2016/038307, International Preliminary Report on Patentability, dated Dec. 26, 2017.

* cited by examiner

*Primary Examiner* — Deve V Hall
(74) *Attorney, Agent, or Firm* — Quarles & Brady LLP

(57) ABSTRACT

The invention provides a composition comprising the following:
A) a first polymer composition comprising an anhydride functionalized ethylene-based polymer, and optionally, an ethylene-based polymer;
B) a filler; and
wherein the anhydride functionalized ethylene-based polymer has a density from 0.855 g/cc to 0.900 g/cc and a melt viscosity, at 177° C., from 1000 to 50,000 cP.

14 Claims, No Drawings

FILLED POLYMER-BASED COMPOSITIONS WITH LOW VISCOSITY, GOOD MECHANICAL PROPERTIES AND ADHESION

REFERENCE TO RELATED APPLICATIONS

The present application claims the benefit of U.S. Provisional Application No. 62/184,087, filed on Jun. 24, 2015, and incorporated herein by reference.

BACKGROUND

There is a need to optimize the balance of flow, mechanical and adhesion properties of a highly filled polymer-based compositions. Typically, high flow ethylene-based polymers can be highly filled with fillers such as talc, CaCO3, or coal fly ash to improve mechanical properties and increased abrasion and scratch resistance. However, such high filler loadings typically increase the viscosity of the final composition, and thus reduced flow properties. The addition of plasticizers, such as oils, can reduce the compositions viscosity and improve the flow characteristics, but, such additions typically result in poor mechanical properties and poor adhesion properties.

Filled polymer compositions and other compositions are disclosed in the following references: US Publication 20090202847, U.S. Pat. Nos. 7,550,528, 7,335,696 (see also U.S. Pat. No. 7,781,510), US Publication 2010/0160497, JP 09286878A (Abstract), U.S. Pat. No. 3,963,850, JP 5078589A (Abstract), JP 09286878A (Abstract), U.S. Pat. No. 3,963,850A, JP 5078589A (Abstract), International Publication No. WO 2015/013472, International Publication No. WO 98/38245, International Publication No. WO 2004/035680, International Application No. PCT/CN14/084914, filed Aug. 21, 2014, International Application No. PCT/CN14/072208, filed Dec. 23, 2014, U.S. application Ser. No. 14/408,152, filed Mar. 14, 2013.

However, as discussed above, there is need for new filled ethylene-based polymer compositions that have optimize the balance of flow, mechanical and adhesion properties of a highly filled polymer-based compositions, especially when such compositions are used as substrate for paint or other coatings. This need has been met by the following invention.

SUMMARY OF THE INVENTION

The invention provides a composition comprising the following:
A) a first polymer composition comprising an anhydride functionalized ethylene-based polymer, and optionally, an ethylene-based polymer;
B) a filler; and
wherein the anhydride functionalized ethylene-based polymer has a density from 0.855 g/cc to 0.900 g/cc and a melt viscosity, at 177° C., from 1000 to 50,000 cP.

DETAILED DESCRIPTION

It has been discovered that the inventive compositions described herein provide improved mechanical properties, which can be achieved using a highly filled composition with good high flow characteristics. It has been discovered that such compositions containing an anhydride functionalized ethylene-based polymer and high amounts of filler have an improved balance of mechanical and flow properties. Also, surprisingly, it has been discovered that the inventive compositions shown improved adhesion to paint, making such compositions well suited as substrates for painted and printed articles.

As discussed above, the invention provides a composition comprising the following:
A) a first polymer composition comprising an anhydride functionalized ethylene-based polymer, and optionally, an ethylene-based polymer;
B) a filler; and
wherein the anhydride functionalized ethylene-based polymer has a density from 0.855 g/cc to 0.900 g/cc, and a melt viscosity, at 177° C., from 1000 to 50,000 cP.

An inventive composition may comprise a combination of two or more embodiments as described herein.

The anhydride functionalized ethylene-based polymer may comprise a combination of two or more embodiments as described herein.

The filler may comprise a combination of two or more embodiments as described herein.

In one embodiment, the composition comprises greater than, or equal to, 1.0 wt %, or greater than, or equal to, 1.2 wt %, or greater than, or equal to, 1.4 wt %, or greater than, or equal to, 1.6 wt %, or greater than, or equal to, 1.8 wt %, of the anhydride functionalized ethylene-based polymer, based on the weight of the composition.

In one embodiment, the composition comprises greater than, or equal to, 2.0 wt %, or greater than, or equal to, 2.2 wt %, or greater than, or equal to, 2.4 wt %, or greater than, or equal to, 2.6 wt %, or greater than, or equal to, 2.8 wt %, of the anhydride functionalized ethylene-based polymer, based on the weight of the composition.

In one embodiment, the composition comprises less than, or equal to, 75.0 wt %, or less than, or equal to, 70.0 wt %, or less than, or equal to, 65.0 wt %, less than, or equal to, 60.0 wt %, of the anhydride functionalized ethylene-based polymer, based on the weight of the composition.

In one embodiment, the composition comprises less than, or equal to, 50.0 wt %, or less than, or equal to, 45.0 wt %, or less than, or equal to, 40.0 wt %, of the anhydride functionalized ethylene-based polymer, based on the weight of the composition.

In one embodiment, the composition comprises ≥1.0 wt %, or ≥1.5 wt %, or ≥2.0 wt %, or ≥3.0 wt % of the anhydride functionalized ethylene-based polymer, based on the weight of the composition. In one embodiment, the composition comprises ≤75 wt %, or ≤60 wt %, or ≤50 wt %, or ≤40 wt % of the anhydride functionalized ethylene-based polymer, based on the weight of the composition.

In one embodiment, the composition comprises from 1.0 wt % to 75.0 wt %, or from 1.5 wt % to 70.0 wt %, or from 2.0 wt % to 65.0 wt % of the anhydride functionalized ethylene-based polymer, based on the weight of the composition.

In one embodiment, the composition comprises from 1.0 wt % to 50.0 wt %, or from 1.5 wt % to 40.0 wt %, or from 2.0 wt % to 30.0 wt % of the anhydride functionalized ethylene-based polymer, based on the weight of the composition.

In one embodiment, the anhydride functional ethylene-based polymer comprises from 0.5 wt % to 3.0 wt %, or from 0.5 to 2.5 wt %, or from 0.5 to 2.0 wt % anhydride, based on the weight of the functional polymer.

In one embodiment, the weight ratio of the first polymer composition to the filler is from 1.0/1.0 to 1.0/5.0, or from 0.5/1.0 to 1.0/5.0, or from 0.6/1.0 to 1.0/5.0.

In one embodiment, the anhydride functionalized ethylene-based polymer is a maleic anhydride functionalized ethylene-based polymer, and further a maleic anhydride grafted ethylene-based polymer.

In one embodiment, the anhydride functionalized ethylene-based polymer is a maleic anhydride functionalized ethylene/alpha-olefin interpolymer, and further a maleic anhydride grafted ethylene/alpha-olefin interpolymer. Preferred α-olefins include, but are not limited to, C3-C20 α-olefins, and preferably C3-C10 α-olefins. More preferred α-olefins include propylene, 1-butene, 1-pentene, 1-hexene, 1-heptene and 1-octene, and more preferably include propylene, 1-butene, 1-hexene and 1-octene.

In one embodiment, the anhydride functionalized ethylene-based polymer is a maleic anhydride functionalized ethylene/alpha-olefin copolymer, and further a maleic anhydride grafted ethylene/alpha-olefin copolymer. Preferred α-olefins include, but are not limited to, C3-C20 α-olefins, and preferably C3-C10 α-olefins. More preferred α-olefins include propylene, 1-butene, 1-pentene, 1-hexene, 1-heptene and 1-octene, and more preferably include propylene, 1-butene, 1-hexene and 1-octene.

In one embodiment, the composition further comprises a tackifier, and further from 2.0 to 25.0 wt %, or from 5.0 to 20.0 wt %, or from 10.0 to 16.0 wt % tackifier, based on the weight of the composition.

In one embodiment, the composition comprises a tackifier, and the weight ratio of the tackifier to the filler is from 0.2:1 to 1:1, or from 0.28:1 to 0.7:1, or from 0.2:1 to 0.35:1.

Tackifiers are typically chemical compounds, used in adhesive formulation or other formulations, to increase the tack (stickiness) of the formulation. In one embodiment, example tackifiers include rosins and their derivates; terpenes and modified terpenes; aliphatic, cycloaliphatic and aromatic resins (for example, C5 aliphatic resins, C9 aromatic resins, and C5/C9 aliphatic/aromatic resins); hydrogenated hydrocarbon resins; mixtures of hydrogenated hydrocarbon resins; and terpene-phenol resins. In one embodiment, the tackifier is selected from hydrogenated hydrocarbon resins and mixtures of hydrogenated hydrocarbon resins.

In one embodiment, the first composition comprises the ethylene-based polymer. In a further embodiment, the ethylene-based polymer is an ethylene/alpha-olefin interpolymer, and further an ethylene/alpha-olefin copolymer.

In one embodiment, the ethylene-based polymer has a density from 0.855 to 0.890 g/cc, or from 0.885 to 0.885 g/cc, or from 0.860 to 0.880 g/cc (1 cc=1 cm$^3$).

In one embodiment, the weight ratio of the ethylene-based polymer to the anhydride functionalized ethylene-based polymer is from 1/1 to 6/1, or from 1/1 to 5/1.

In one embodiment, the ratio of "the density of the anhydride functionalized ethylene-based polymer" to "the density of the ethylene-based polymer" is from 0.7 to 1.3, or from 0.8 to 1.2, further from 0.9 to 1.1.

In one embodiment, the ratio of "the melt viscosity, at 177° C., of the anhydride functionalized ethylene-based polymer" to "the melt viscosity, at 177° C., of the ethylene-based polymer" is from 1.0 to 2.0, further from 1.2 to 1.8, further from 1.5 to 1.7.

In one embodiment, the anhydride functionalized ethylene-based polymer is an anhydride functionalized ethylene/alpha-olefin interpolymer, and further an anhydride functionalized ethylene/alpha-olefin copolymer.

In one embodiment, the anhydride functionalized ethylene/alpha-olefin interpolymer, and further copolymer, has a density from 0.855 to 0.890 g/cc, or from 0.855 to 0.885 g/cc, or from 0.860 to 0.885 g/cc, or from 0.860 to 0.880 g/cc.

In one embodiment, the anhydride functionalized ethylene/alpha-olefin interpolymer, and further copolymer, has a molecular weight distribution (MWD) from 1.5 to 5.0, or from 1.5 to 4.0, or from 1.5 to 3.0, or from 1.5 to 2.5.

In one embodiment, the first composition is present in an amount from 10 to 80 weight percent, or from 14 to 70 weight percent, or from 20 to 65 weight percent, based on the weight of the composition.

In one embodiment, the composition comprises greater than, or equal to, 70 wt %, or greater than, or equal to, 72 wt %, or greater than, or equal to, 75 wt %, or greater than, or equal to, 80 wt %, or greater than, or equal to, 85 wt %, of the sum weight of component A and component B, based on the weight of the composition.

In one embodiment, the composition has viscosity (V0.1 at 0.1 rad/s and 100° C.) from 1,000 to 10,000 Pa·s, or from 1,000 to 8,000 Pa·s, or from 1,000 to 6,000 Pa·s.

In one embodiment, the composition has viscosity (V0.1 at 0.1 rad/s and 100° C.) from 1,000 to 5,000 Pa·s, or from 1,000 to 4,000 Pa·s, or from 1,000 to 3,000 Pa·s.

In one embodiment, the composition has a rheology ratio (V0.1/V100, at 100° C.) from 5.5 to 10.5, or from 6.0 to 10.0, or from 6.5 to 9.5.

In one embodiment, the composition has tan delta (DMS, 23° C.) from 0.10 to 0.18, or from 0.11 to 0.18, or from 0.12 to 0.18.

In one embodiment, the composition has a Shore A Hardness from 20 to 80, or from 30 to 75, or from 40 to 70.

In one embodiment, the composition has a melting temperature, Tm, from 30° C. to 70° C., or from 40° C. to 70° C., or from 50° C. to 70° C., or from 52° C. to 68° C.

In one embodiment, the composition has a melting temperature, Tc, from 25° C. to 55° C., or from 30° C. to 52° C., or from 35° C. to 50° C.

In one embodiment, the composition has a 10% Modulus ≥90 psi, or ≥100 psi, or ≥110 psi, or ≥120 psi, or ≥130 psi, or ≥140 psi, or ≥150 psi, or ≥200 psi, or ≥250 psi, or ≥300 psi, or ≥350 psi. In a further embodiment, the composition has a 10% Modulus ≤1000 psi, or ≤950 psi, or ≤900 psi, or ≤800 psi, or ≤750 psi, or ≤700 psi.

In one embodiment, the composition has a 10% Modulus from 90 to 800 psi, or from 100 to 750 psi, or from 110 to 700 psi.

In one embodiment, the composition has a Tear Strength from 30 to 200 lbf/in, or from 40 to 180 lbf/in, or from 50 to 150 lbf/in.

In one embodiment, the weight ratio of the first composition to tackifier is from 1:1 to 6:1, or from 2:1 to 6:1, or from 3:1 to 5.5:1, or from 4:1 to 5.25:1, or from 4.5:1 to 5.25:1.

In one embodiment, the composition comprises the following: a) from 2.0 to 90.0 wt %, or from 2.0 to 70.0 wt %, or from 2.0 to 50.0 wt %, or from 2.0 to 40.0 wt %, or from of the anhydride functionalized ethylene-based polymer; b) from 0 to 90.0 wt %, or from 5.0 to 80.0 wt %, or from 10.0 to 75.0 wt %, or from 20 to 70.0 wt %, of the ethylene-based polymer, c) from 25.0 to 80.0 wt %, or from 30.0 to 75.0 wt %, or from 40.0 to 70.0 wt %, or from 50.0 to 70.0 wt %, of the filler (e.g., talc, coal fly ash, CaCO$_3$); and d) from 0 to 15 wt %, or from 2.0 to 25.0 wt %, or from 5.0 to 20.0 wt %, or from 10.0 to 16.0 wt % of a tackifier (e.g., hydrocarbon tackifier).

In one embodiment, the composition comprises less than 1000 ppm, further less than 500 ppm of an alkylacrylate copolymer, based on the weight of the composition.

In one embodiment, the composition does not comprise an alkylacrylate copolymer.

In one embodiment, the composition comprises less than 1000 ppm, further less than 500 ppm of a propylene-based polymer, based on the weight of the composition.

In one embodiment, the composition does not comprise a propylene-based polymer.

In one embodiment, the filler is selected from the following: talc, calcium carbonate, carbon black, coal fly ash, glass fibers, polymeric fibers (including nylon, rayon, cotton, polyester, and polyaramide), metal fibers, flakes or particles, clays, mica, silica, alumina, aluminosilicates or aluminophosphates, carbon whiskers, carbon fibers, wollastonite, graphite, zeolites, silicon carbide, silicon nitride, titanates (e.g., titanium dioxide), or combinations thereof.

In one embodiment, the filler is selected from the following: talc, calcium carbonate, coal fly ash, or combinations thereof.

In one embodiment, the composition comprises ≥15.0 wt %, or ≥20.0 wt %, or ≥25.0 wt %, or ≥30.0 wt %, or ≥35.0 wt %, or ≥40.0 wt %, or ≥45.0 wt %, or ≥50.0 wt %, of the filler (e.g., talc, coal fly ash, $CaCO_3$). In a further embodiment, the composition comprises ≤85.0 wt %, or ≤80.0 wt %, or ≤75.0 wt %, or ≤70.0 wt %, or ≤65.0 wt % of the filler (e.g., talc, coal fly ash, $CaCO_3$).

The inventive composition may comprise a combination of two or more embodiments as described herein.

The invention also provides an article comprising at least one component formed from an inventive composition of any one or more embodiments described herein. In a further embodiment, the article further comprises a substrate.

An inventive article may comprise a combination of two or more embodiments as described herein.

Further Embodiments—Anhydride Ethylene-Based Polymer and Ethylene-Based Polymer

In one embodiment, the anhydride functionalized ethylene-based polymer of component A has a density greater than, or equal to, 0.857 g/cc, further greater than, or equal to, 0.860 g/cc, add further greater than, or equal to, 0.865 g/cc. In a further embodiment, the anhydride functionalized ethylene-based polymer is an anhydride functionalized ethylene/α-olefin interpolymer, and further an anhydride functionalized ethylene/α-olefin copolymer.

Preferred α-olefins include, but are not limited to, C3-C20 α-olefins, and preferably C3-C10 α-olefins. More preferred α-olefins include propylene, 1-butene, 1-pentene, 1-hexene, 1-heptene and 1-octene, and more preferably include propylene, 1-butene, 1-hexene and 1-octene.

In one embodiment, the anhydride functionalized ethylene-based polymer of component A has a density less than, or equal to, 0.892 g/cc, further less than, or equal to, 0.890 g/cc, and further less than, or equal to, 0.885 g/cc. In a further embodiment, the anhydride functionalized ethylene-based polymer is an anhydride functionalized ethylene/α-olefin interpolymer, and further an anhydride functionalized ethylene/α-olefin copolymer. Some preferred α-olefins are discussed above.

In one embodiment, the anhydride functionalized ethylene-based polymer of component A has a density from 0.857 g/cc to 0.892 g/cc, further from 0.860 g/cc to 0.890 g/cc, and further from 0.865 g/cc to 0.885 g/cc. In a further embodiment, the anhydride functionalized ethylene-based polymer is an anhydride functionalized ethylene/α-olefin interpolymer, and further an anhydride functionalized ethylene/α-olefin copolymer. Some preferred α-olefins are discussed above.

In one embodiment, the anhydride functionalized ethylene-based polymer of Component A comprises from 0.5 to 3.0 weight percent, further from 0.5 to 2.5 weight percent, further from 0.5 to 2.0 weight percent of the anhydride functionality, based on the weight of the polymer. A further embodiment, the anhydride functionalized ethylene-based polymer is an anhydride functionalized ethylene/α-olefin interpolymer, and further an anhydride functionalized ethylene/α-olefin copolymer. Some preferred α-olefins are discussed above.

In one embodiment, the anhydride functionalized ethylene-based polymer of Component A has a melt viscosity less than, or equal to, 40,000 cP, further less than, or equal to, 30,000 cP, further less than, or equal to, 20,000 cP, and further less than, or equal to, 15,000 cP, at 350° F. (177° C.). In a further embodiment, the anhydride functionalized ethylene-based polymer is an anhydride functionalized ethylene/α-olefin interpolymer, and further an anhydride functionalized ethylene/α-olefin copolymer. Some preferred α-olefins are discussed above.

In one embodiment, anhydride functionalized ethylene-based polymer of Component A has a melt viscosity greater than, or equal to, 2,000 cP, further greater than, or equal to, 3,000 cP, further greater than, or equal to, 4,000 cP, and further greater than, or equal to, 5,000 cP, at 350° F. (177° C.). In a further embodiment, the anhydride functionalized ethylene-based polymer is an anhydride functionalized ethylene/α-olefin interpolymer, and further an anhydride functionalized ethylene/α-olefin copolymer. Some preferred α-olefins are discussed above.

In one embodiment, the anhydride functionalized ethylene-based polymer of component A has a melt viscosity from 2,000 cP to 50,000 cP, further from 3,000 cP to 40,000 cP, further from 4,000 cP to 30,000 cP, at 350° F. (177° C.), and further from 5,000 cP to 20,000 cP, at 350° F. (177° C.). In a further embodiment, the anhydride functionalized ethylene-based polymer is an anhydride functionalized ethylene/α-olefin interpolymer, and further an anhydride functionalized ethylene/α-olefin copolymer. Some preferred α-olefins are discussed above.

In one embodiment, the anhydride functionalized ethylene-based polymer of component A has a molecular weight distribution (Mw/Mn) less than, or equal to, 5.0, further less than, or equal to, 4.0, further less than, or equal to, 3.0. In a further embodiment, the anhydride functionalized ethylene-based polymer is an anhydride functionalized ethylene/α-olefin interpolymer, and further an anhydride functionalized ethylene/α-olefin copolymer. Some preferred α-olefins are discussed above.

In one embodiment, the anhydride functionalized ethylene-based polymer of component A has a molecular weight distribution (Mw/Mn) greater than, or equal to, 1.5, further greater than, or equal to, 2.0, and further greater than, or equal to, 2.5. In a further embodiment, the anhydride functionalized ethylene-based polymer is an anhydride functionalized ethylene/α-olefin interpolymer, and further an anhydride functionalized ethylene/α-olefin copolymer. Some preferred α-olefins are discussed above.

In one embodiment, the anhydride functionalized ethylene-based polymer of component A has a weight average molecular weight (Mw) less than, or equal to, 50,000 g/mole, further less than, or equal to, 40,000 g/mole, further less than, or equal to, 30,000 g/mole. In a further embodiment, the anhydride functionalized ethylene-based polymer is an anhydride functionalized ethylene/α-olefin interpolymer, and further an anhydride functionalized ethylene/α-olefin copolymer. Some preferred α-olefins are discussed above.

In one embodiment, the anhydride functionalized ethylene-based polymer of component A has a weight average molecular weight (Mw) greater than, or equal to, 3000 g/mole, further greater than, or equal to, 5000 g/mole, further greater than, or equal to, 10000 g/mole, further greater than, or equal to, 15000 g/mole. In a further embodiment, the anhydride functionalized ethylene-based polymer is an anhydride functionalized ethylene/α-olefin interpolymer, and further an anhydride functionalized ethylene/α-olefin copolymer. Some preferred α-olefins are discussed above.

In one embodiment, the anhydride functionalized ethylene-based polymer of component A has a melt index (I2), or calculated melt index (I2), greater than, or equal to, 300 g/10 min, further greater than, or equal to, 400 g/10 min, and more further greater than, or equal to, 500 g/10 min. In a further embodiment, the anhydride functionalized ethylene-based polymer is an anhydride functionalized ethylene/α-olefin interpolymer, and further an anhydride functionalized ethylene/α-olefin copolymer. Some preferred α-olefins are discussed above.

In one embodiment, the anhydride functionalized ethylene-based polymer of component A has a melt index (I2), or calculated melt index (I2), less than, or equal to, 1500 g/10 min, further less than, or equal to, 1200 g/10 min, and more further less than, or equal to, 1000 g/10 min. In a further embodiment, the anhydride functionalized ethylene-based polymer is an anhydride functionalized ethylene/α-olefin interpolymer, and further an anhydride functionalized ethylene/α-olefin copolymer. Some preferred α-olefins are discussed above.

In one embodiment, the anhydride functionalized ethylene-based polymer of component A has a percent crystallinity of less than, or equal to, 40 percent, further less than, or equal to, 35 percent, further less than, or equal to, 30 percent, further less than, or equal to, 25 percent, and further less than, or equal to, 20 percent, as determined by DSC. In a further embodiment, the anhydride functionalized ethylene-based polymer is an anhydride functionalized ethylene/α-olefin interpolymer, and further an anhydride functionalized ethylene/α-olefin copolymer. Some preferred α-olefins are discussed above.

In one embodiment, the anhydride functionalized ethylene-based polymer of component A has a percent crystallinity of greater than, or equal to, 2 percent, further greater than, or equal to, 5 percent, and further greater than, or equal to, 10 percent, as determined by DSC. In a further embodiment, the anhydride functionalized ethylene-based polymer is an anhydride functionalized ethylene/α-olefin interpolymer, and further an anhydride functionalized ethylene/α-olefin copolymer. Some preferred α-olefins are discussed above.

Suitable functionalized copolymers include MAH-grafted copolymers (for example, AFFINITY GA 1000R Polyolefin Plastomers, available from The Dow Chemical Company).

An anhydride functionalized ethylene-based polymer may comprise a combination of two or more embodiments as described herein.

The anhydride functionalized ethylene/alpha-olefin interpolymer of component A may comprise a combination of two or more embodiments as described herein.

The anhydride functionalized ethylene/alpha-olefin copolymer of component A may comprise a combination of two or more embodiments as described herein.

In one embodiment, component A) comprises the ethylene-based polymer, and further an ethylene/alpha-olefin interpolymer, and further an ethylene/alpha-olefin copolymer.

Preferred α-olefins include, but are not limited to, C3-C20 α-olefins, and preferably C3-C10 α-olefins. More preferred α-olefins include propylene, 1-butene, 1-pentene, 1-hexene, 1-heptene and 1-octene, and more preferably include propylene, 1-butene, 1-hexene and 1-octene.

In one embodiment, the ethylene-based polymer of component A, has a melt viscosity less than, or equal to, 40,000 cP, further less than, or equal to, 30,000 cP, further less than, or equal to, 20,000 cP, and further less than, or equal to, 10,000 cP, at 350° F. (177° C.). In a further embodiment, the ethylene-based polymer is an ethylene/alpha-olefin interpolymer, and further an ethylene/alpha-olefin copolymer. Preferred alpha-olefins are discussed above.

In one embodiment, ethylene-based polymer of component A, has a melt viscosity greater than, or equal to, 2,000 cP, further greater than, or equal to, 3,000 cP, further greater than, or equal to, 4,000 cP, and further greater than, or equal to, 5,000 cP, at 350° F. (177° C.). In a further embodiment, the ethylene-based polymer is an ethylene/alpha-olefin interpolymer, and further an ethylene/alpha-olefin copolymer. Preferred alpha-olefins are discussed above.

In one embodiment, the ethylene-based polymer of component A, has a melt viscosity from 2,000 cP to 40,000 cP, further from 3,000 cP to 30,000 cP, further from 4,000 cP to 20,000 cP, at 350° F. (177° C.), and further from 5,000 cP to 10,000 cP, at 350° F. (177° C.). In a further embodiment, the ethylene-based polymer is an ethylene/alpha-olefin interpolymer, and further an ethylene/alpha-olefin copolymer. Preferred alpha-olefins are discussed above.

In one embodiment, the ethylene-based polymer of component A, has a molecular weight distribution (Mw/Mn) less than, or equal to, 3.5, further less than, or equal to, 3.0, further less than, or equal to, 2.5, and further less than, or equal to, 2.3. In a further embodiment, the ethylene-based polymer is an ethylene/alpha-olefin interpolymer, and further an ethylene/alpha-olefin copolymer. Preferred alpha-olefins are discussed above.

In one embodiment, the ethylene-based polymer of component A, has a molecular weight distribution (Mw/Mn) greater than, or equal to, 1.1, further greater than, or equal to, 1.3, further greater than, or equal to, 1.5, and further greater than, or equal to, 1.7. In a further embodiment, the ethylene-based polymer is an ethylene/alpha-olefin interpolymer, and further an ethylene/alpha-olefin copolymer. Preferred alpha-olefins are discussed above.

In one embodiment, the ethylene-based polymer, and further ethylene/alpha-olefin interpolymer, and further copolymer of component A, has a weight average molecular weight distribution (Mw) less than, or equal to, 50,000 g/mole, further less than, or equal to, 40,000 g/mole, further less than, or equal to, 30,000 g/mole. In a further embodiment, the ethylene-based polymer is an ethylene/alpha-olefin interpolymer, and further an ethylene/alpha-olefin copolymer. Preferred alpha-olefins are discussed above.

In one embodiment, the ethylene-based polymer of component A, has a weight average molecular weight (Mw) greater than, or equal to, 5000 g/mole, further greater than, or equal to, 10000 g/mole, further greater than, or equal to, 12000 g/mole, further greater than, or equal to, 15000 g/mole. In a further embodiment, the ethylene-based polymer is an ethylene/alpha-olefin interpolymer, and further an ethylene/alpha-olefin copolymer. Preferred alpha-olefins are discussed above.

In one embodiment, the ethylene-based polymer of component A, has a melt index (I2 or MI), or calculated melt index (I2 or MI), greater than, or equal to, 200 g/10 min, further greater than, or equal to, 500 g/10 min, and more further greater than, or equal to, 800 g/10 min. In a further embodiment, the ethylene-based polymer is an ethylene/alpha-olefin interpolymer, and further an ethylene/alpha-olefin copolymer. Preferred alpha-olefins are discussed above.

In one embodiment, the ethylene-based polymer of component A, has a melt index (I2 or MI), or calculated melt index (I2 or MI), less than, or equal to, 2000 g/10 min, further less than, or equal to, 1500 g/10 min, and further less than, or equal to, 1200 g/10 min. In a further embodiment, the ethylene-based polymer is an ethylene/alpha-olefin interpolymer, and further an ethylene/alpha-olefin copolymer. Preferred alpha-olefins are discussed above.

In one embodiment, the ethylene-based polymer of component A, has a percent crystallinity of less than, or equal to, 50 percent, further less than, or equal to, 40 percent, and further less than, or equal to, 30 percent, further less than, or equal to, 20 percent as determined by DSC. In a further embodiment, the ethylene-based polymer is an ethylene/alpha-olefin interpolymer, and further an ethylene/alpha-olefin copolymer. Preferred alpha-olefins are discussed above.

In one embodiment, the ethylene-based polymer of component A, has a percent crystallinity of greater than, or equal to, 2 percent, further greater than, or equal to, 5 percent, and further greater than, or equal to, 10 percent, as determined by DSC. In a further embodiment, the ethylene-based polymer is an ethylene/alpha-olefin interpolymer, and further an ethylene/alpha-olefin copolymer. Preferred alpha-olefins are discussed above.

In one embodiment, the ethylene-based polymer of component A, has a density greater than, or equal to, 0.855 g/cc, further greater than, or equal to, 0.860 g/cc, further greater than, or equal to, 0.865 g/cc. In a further embodiment, the ethylene-based polymer is an ethylene/alpha-olefin interpolymer, and further an ethylene/alpha-olefin copolymer. Preferred alpha-olefins are discussed above.

In one embodiment, the ethylene-based polymer of component A, has a density less than, or equal to, 0.900 g/cc, further less than, or equal to, 0.895 g/cc, further less than, or equal to, 0.890 g/cc, and further less than, or equal to, 0.885 g/cc. In a further embodiment, the ethylene-based polymer is an ethylene/alpha-olefin interpolymer, and further an ethylene/alpha-olefin copolymer. Preferred alpha-olefins are discussed above. Preferred alpha-olefins are discussed above.

In one embodiment, the ethylene-based polymer of component A, has a density from 0.855 g/cm$^3$ to 0.900 g/cm$^3$, further from 0.860 g/cm$^3$ to 0.895 g/cm$^3$, and further from 0.865 g/cm$^3$ to 0.890 g/cm$^3$. Preferred alpha-olefins are discussed above. In a further embodiment, the ethylene-based polymer is an ethylene/alpha-olefin interpolymer, and further an ethylene/alpha-olefin copolymer. Preferred alpha-olefins are discussed above.

In one embodiment, the ethylene-based polymer, and further ethylene/α-olefin interpolymer, of component A is a homogeneously branched linear interpolymer, and further a copolymer, or a homogeneous branched substantially linear interpolymer, and further a copolymer. Preferred alpha-olefins are discussed above.

In one embodiment, the ethylene-based polymer, and further ethylene/α-olefin interpolymer, of component A is a homogeneously branched linear interpolymer, and further a copolymer.

In one embodiment, the ethylene-based polymer, and further ethylene/α-olefin interpolymer, of component A is a homogeneous branched substantially linear interpolymer, and further a copolymer.

Some examples of ethylene/α-olefin copolymers include AFFINITY GA Polyolefin Plastomers, available from The Dow Chemical Company, and LICOCENE Performance Polymers from Clariant. Other examples of ethylene/α-olefin interpolymers, suitable for the invention, include the ultra low molecular weight ethylene polymers described in U.S. Pat. Nos. 6,335,410, 6,054,544 and 6,723,810, each fully incorporated herein by reference.

The ethylene-based polymer of component A may comprise a combination of two or more embodiments as described herein.

The ethylene/alpha-olefin interpolymer of component A may comprise a combination of two or more embodiments as described herein.

The ethylene/alpha-olefin copolymer of component A may comprise a combination of two or more embodiments as described herein.

Additives and Applications

An inventive composition may comprise one or more additives. Typically polymers used in the invention are treated with one or more stabilizers, for example, antioxidants, such as, for example, IRGANOX 1010, IRGANOX 1076, and IRGAFOS 168, now supplied by BASF. Polymers are typically treated with one or more stabilizers before an extrusion or other melt processes. Other polymeric additives include, but are not limited to, ultraviolet light absorbers, antistatic agents, pigments and dyes, nucleating agents, fillers, slip agents, fire retardants, plasticizers, processing aids, lubricants, stabilizers, smoke inhibitors, viscosity control agents, waxes, and anti-blocking agents. The inventive compositions may also contain one or more thermoplastic polymers.

The inventive compositions may be prepared by standard melt blending procedures. In particular, the maleic anhydride-grafted polymer or blend, tackifier(s) and other components may be melt blended, until a homogeneous mix is obtained. Any mixing method producing a homogeneous blend, without degrading the adhesive components, is satisfactory, such as a vessel equipped with a stirrer, and an optional heating mechanism. The adhesives can be provided in forms, such as pellets, pillows, chiclets, drags, or any other desired configurations.

The inventive compositions may also be used in a variety of application. The invention provides for an article comprising at least one component formed from an inventive composition. Articles include, but not limited to, painted substrates, packages, automotive components, graphic arts, nonwovens, tapes, hot melt adhesives, coatings, inks, personal care and cosmetic products, sealants, color and additive concentrates, carpet components, and furniture.

Definitions

Unless stated to the contrary, all test methods are current as of the filing date of this disclosure.

The term "composition," as used herein, includes a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities, for example, catalyst residues, may be incorporated into and/or within the polymer.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term, "olefin-based polymer," as used herein, refers to a polymer that comprises, in polymerized form, a majority amount of olefin monomer, for example ethylene or propylene (based on the weight of the polymer), and optionally may comprise one or more comonomers.

The term, "ethylene-based polymer," as used herein, refers to a polymer that comprises, in polymerized form, a majority amount of ethylene monomer (based on the weight of the polymer), and optionally may comprise one or more comonomers.

The term, "ethylene/α-olefin interpolymer," as used herein, refers to an interpolymer that comprises, in polymerized form, a majority amount of ethylene monomer (based on the weight of the interpolymer), and at least one α-olefin.

The term, "ethylene/α-olefin copolymer," as used herein, refers to a copolymer that comprises, in polymerized form, a majority amount of ethylene monomer (based on the weight of the copolymer), and an α-olefin, as the only two monomer types.

The term, "propylene-based polymer," as used herein, refers to a polymer that comprises, in polymerized form, a majority amount of propylene monomer (based on the weight of the polymer), and optionally may comprise one or more comonomers.

The term "anhydride functionalized ethylene-based polymer," as used herein, refers to an ethylene-based polymer comprising bonded anhydride groups (for example, bonded MAH (bonded maleic anhydride), and further grafted MAH (grafted maleic anhydride)). It is understood that a minor portion of the bonded anhydride may hydrolyzed into acid groups.

The term "fully hydrogenated," as used herein, refers to a hydrogenation level greater than 90%. The term "partially hydrogenated," as used herein, refers to a hydrogenation level from 50% to 90%. The term "non-hydrogenated," as used herein, refers to a hydrogenation level less than 50%. The hydrogenation level can be determined by those skilled in the art, for example, by proton (1H) NMR.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Melt Viscosity

Melt viscosity is measured in accordance with ASTM D 3236 (350° F.), using a Brookfield Digital Viscometer (Model DV-III, version 3), and disposable aluminum sample chambers. The spindle used, in general, is a SC-31 hot-melt spindle, suitable for measuring viscosities in the range from 10 to 100,000 centipoise. The sample (polymer or adhesive composition) is poured into the chamber, which is, in turn, inserted into a Brookfield Thermosel, and locked into place. The sample chamber has a notch on the bottom that fits the bottom of the Brookfield Thermosel, to ensure that the chamber is not allowed to turn when the spindle is inserted and spinning. The sample (approximately 8-10 grams of resin) is heated to the required temperature, until the melted sample is about one inch below the top of the sample chamber. The viscometer apparatus is lowered, and the spindle submerged into the sample chamber. Lowering is continued, until the brackets on the viscometer align on the Thermosel. The viscometer is turned on, and set to operate at a shear rate, which leads to a torque reading in the range of 40 to 60 percent of the total torque capacity, based on the rpm output of the viscometer. Readings are taken every minute for about 15 minutes, or until the values stabilize, at which point, a final reading is recorded.

Melt Index

Melt index (I2, or MI) of an ethylene-based polymer is measured in accordance with ASTM D-1238, condition 190° C./2.16 kg. For high I2 polymers (I2 greater than, or equal to, 200 g/mole, melt index is preferably calculated from Brookfield viscosity as described in U.S. Pat. Nos. 6,335,410; 6,054,544; 6,723,810. I2(190° C./2.16 kg)= $3.6126[10^{(log(\eta)-6.6928)/-1.136}]-9.31851$, where $\eta$=melt viscosity, in cP, at 350° F. (177° C.).

Gel Permeation Chromatography

The average molecular weights and molecular weight distributions for ethylene-based polymers are determined with a chromatographic system, consisting of either a Polymer Laboratories Model PL-210 or a Polymer Laboratories Model PL-220. The column and carousel compartments are operated at 140° C. for ethylene-based polymers. The columns are three Polymer Laboratories 10-micron, Mixed-B columns. The solvent is 1,2,4-trichloro-benzene. The samples are prepared at a concentration of "0.1 gram of polymer" in "50 milliliters" of solvent. The solvent used to prepare the samples contains 200 ppm of butylated hydroxytoluene (BHT). Samples are prepared by agitating lightly, for two hours, at 160° C. The injection volume is "100 microliters," and the flow rate is 1.0 milliliters/minute. Calibration of the GPC column set is performed with narrow molecular weight distribution polystyrene standards, purchased from Polymer Laboratories (UK). The polystyrene standard peak molecular weights are converted to polyethylene molecular weights using the following equation (as described in Williams and Ward, J. Polym. Sci., Polym. Let., 6, 621 (1968)):

$$M_{polyethylene}=A\times(M_{polystyrene})^B,$$

where M is the molecular weight, A has a value of 0.4315 and B is equal to 1.0. Polyethylene equivalent molecular weight calculations were performed using VISCOTEK TriSEC software, Version 3.0. The molecular weights for propylene-based polymers can be determined using Mark-Houwink ratios according to ASTM D6474.9714-1, where, for polystyrene a=0.702 and log K=−3.9, and for polypropylene, a=0.725 and log K=−3.721. For propylene-based polymer samples, the column and carousel compartments are operated at 160° C.

Differential Scanning Calorimetry (DSC) for Polymers

Differential Scanning calorimetry (DSC) is used to measure crystallinity in ethylene (PE) based polymer samples and propylene (PP) based polymer samples. About five to eight milligrams of sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for PP). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (e.g., for PE, % cryst.=($H_f$/292 J/g)× 100; and for PP, % cryst.=($H_f$/165 J/g)×100).

Unless otherwise stated, melting point(s) ($T_m$) and glass transition temperature (Tg) of each polymer is determined from the second heat curve obtained from DSC, as described above. The crystallization temperature ($T_c$) is measured from the first cooling curve.

Density

Density is measured in accordance with ASTM D-792. The density measured is a "quick density," meaning that the density is determined after one hour from the time of molding. Test samples are compression molded at a temperature of 20° C. higher than the melting point of polymer, and at a pressure of 10 MPa for five minutes (dimensions of molded sample: 50 cm²×1-2 mm).

Fourier Transform Infrared Spectroscopy (FTIR) Analysis—Maleic Anhydride Content.

The concentration of maleic anhydride is determined by the ratio of peak heights of the maleic anhydride at wave number 1791 cm$^{-1}$ to the polymer reference peak, which, in case of polyethylene, is at wave number 2019 cm$^{-1}$. Maleic anhydride content is calculated by multiplying this ratio with the appropriate calibration constant. The equation used for maleic grafted polyolefins (with reference peak for polyethylene) has the following form, as shown in Equation 1.

MAH(wt %)=$A$*{[FTIR PeakArea@1791 cm-1]/[FTIR PeakArea 2019 cm-1]+$B$*[FTIR PeakArea@1712 cm-1]/[FTIR PeakArea@2019 cm-1]}  (Eqn. 1)

The calibration constant A can be determined using C13 NMR standards. The actual calibration constant may differ slightly, depending on the instrument and polymer. The second component, at wave number 1712 cm$^{-1}$, accounts for the presence of maleic acid, which is negligible for freshly grafted material. Over time however, maleic anhydride is readily converted to maleic acid in the presence of moisture. Depending on surface area, significant hydrolysis can occur in just a few days under ambient conditions. The acid has a distinct peak at wave number 1712 cm$^{-1}$. The constant B in Equation 1 is a correction for the difference in extinction coefficients between the anhydride and acid groups.

The sample preparation procedure begins by making a pressing, typically 0.05 to 0.15 millimeters in thickness, in a heated press, between two protective films, at 150-180° C. for one hour. MYLAR and TEFLON are suitable protective films to protect the sample from the platens. Aluminum foil must never be used (maleic anhydride reacts with aluminum). Platens should be under pressure (~10 ton) for about five minutes. The sample is allowed to cool to room temperature, placed in an appropriate sample holder, and then scanned in the FTIR. A background scan should be run before each sample scan, or as needed. The precision of the test is good, with an inherent variability of less than ±5%. Samples should be stored with desiccant to prevent excessive hydrolysis. Moisture content in the product has been measured as high as 0.1 weight percent. The conversion of anhydride to acid however is reversible with temperature, but may take up to one week for complete conversion. The reversion is best performed in a vacuum oven at 150° C.; a good vacuum (near 30 inches Hg) is required. If the vacuum is less than adequate, the sample tends to oxidize, resulting in an infrared peak at approximately 1740 cm$^{-1}$, which will cause the values for the graft level to be too low. Maleic anhydride and acid are represented by peaks at about 1791 and 1712 cm$^{-1}$, respectively.

Dynamic Mechanical Spectroscopy (DMS—Solid)

The dynamic mechanical measurements (loss and storage modulus vs. temperature) are measured on TA instruments ARES. The dynamic modulus measurements were performed in torsion on a solid bar of about 2 mm thickness, 5 mm wide and about 10 mm in length, cut from a compression molded plaque (see experimental section). The data was recorded at a constant frequency of 10 rad/s, and at a heating/cooling rate of 5° C./min. The temperature sweeps were performed from −50 to 190° C. at 5° C./min. Reported values include the G' and the tan delta (ratio of G" and G' response) at 23° C.

Dynamic Mechanical Spectroscopy (DMS—Melt)

Small angle oscillatory shear (melt DMS) was performed using a TA Instruments ARES, equipped with "25 mm parallel plates," under a nitrogen purge. The time between sample loading, and the beginning of the test, was set to five minutes for all samples. The experiments were performed at 100° C., over a frequency range of 0.1 to 100 rad/s. The strain amplitude was adjusted, based upon the response of the samples from 1 to 3%. The stress response was analyzed in terms of amplitude and phase, from which, the storage modulus (G'), loss modulus (G"), dynamic viscosity η*, and tan delta were calculated. Specimens for Dynamic Mechanical Spectroscopy were "25 mm diameter×3.3 mm thick" compression molded discs, formed at 180° C., and 10 MPa molding pressure, for five minutes, and then quenched between chilled platens (15-20° C.) for two minutes. The V0.1, viscosity is reported for the viscosity value at 0.1 rad/s and reported with the units of Pa-s. The rheology ratio (V0.1/V100 also referred to as "RR") is recorded which is the ratio of the viscosity value at 0.1 rad/s and 100 rad/s.

Mechanical Properties

Tear Strength (lbf/in) was determined using ASTM D624; Thermoplastic Type C, with five samples to obtain the average tear value. ASTM D 624 can be used to measure the resistance to the formation of a tear (tear initiation) and the resistance to the expansion of a tear (tear propagation). The sample is held between two holders and a uniform pulling force applied until the aforementioned deformation occurs. Tear resistance is then calculated by dividing the force applied by the thickness of the material. Each test sample was cut from a compression molded plaque (see experimental section).

Tensile Stress—Strain Properties

Tensile properties were measured using specimens which were die cut, using a small "dog bone" shaped micro tensile die, having the dimensions described in ASTM D-1708. The die cut specimens were cut from the compression molded plaques—see experimental section below. Tensile properties (tensile strength and elongation) were measured at room temperature, using an INSTRON MODEL 1122, made by INSTRU-MET. The "stress versus strain" measurement provides the values for the 10% Modulus (psi)—modulus measured at 10% strain, strain at break (%), and stress at break (psi). An average of five test samples was reported.

Shore A Hardness

Sample specimens (3 cm by 3 cm) were cut from compression molded plaques, which were prepared as described in the experimental section below. Shore A hardness was measured per ASTM D2240, on a Shore A Durometer Model 2000, made by INSTRON, with a Durometer Stand Model 902. This method permits hardness measurements, based on either initial indentation, or indentation after a specific period of time, or both. As used herein, the indentation was measured at a specified time of ten seconds.

EXPERIMENTAL

MAH-P: AFFINITY GA 1000R (MAH functionalized ethylene/octene copolymer, approx. 1 wt % MAH, Melt (Brookfield) Viscosity=13,000 cP at 177° C., and 0.878 g/cc, MWD=2.1). Calculated I2* at 190° C.: 660 g/10 min [melt index may be calculated from the following equation (See U.S. Pat. No. 6,335,410): I2(190° C./2.16 kg)= 3.6126[$10^{(log(\eta)-6.6928)/-1.1363}$]−9.31851, where $\eta$=melt viscosity, in cP, at 350° F. (177° C.)].

P: AFFINITY GA 1900 (0.870 g/cc, 1000 MI, ethylene/octene copolymer, Melt (Brookfield) Viscosity of about 8,200 cP at 177° C.; MWD=2.7).

Fillers—talc, coal fly ash (CFA), and $CaCO_3$

SU-125: SUKOREZ SU-125—Hydrocarbon tackifier

I 225: IRGANOX B225

Study 1

Inventive and comparative compositions are listed in Table 1, and composition properties are shown in Tables 2 and 3.

Table 1 shows the comparative and inventive compositions. For each composition, the components were melt compounded, under a nitrogen purge, in a Laboratory HAAKE mixer (45 gram, small bowl) at a temperature of 150° C. Each composition was then compression molded for further testing.

Compression Molding

Each composition was compression molded at 150 C. The pressure was set at 3000 lbs for 6 minutes, and then increased to 15 tons for 20-25 minutes. The pressure was maintained, while cooling to 30 C at a rate of 15° C./min. Each composition was molded into a "7 inch×7 inch×0.075 inch" plaque. Microtensile and C-tear specimens were cut from the plaques using a punch press. Tables 2 and 3 summarize the mechanical, Shore A, DSC, and DMS solid state, and DMS melt state properties of the compositions.

TABLE 1

Compositions [weight parts; (wt %*)]

| Ex. | P | P-MAH | Talc | CaCO3 | CFA | SU-125 | I225 | Total Parts |
|---|---|---|---|---|---|---|---|---|
| A | 63.8 (63.6 wt %) | | 21.3 (21.2 wt %) | | | 15.0 (15.0 wt %) | 0.2 (0.2 wt %) | 100.3 |
| B | 42.5 (42.4 wt %) | | 42.5/ (42.4 wt %) | | | 15.0 (15.0 wt %) | 0.2 (0.2 wt %) | 100.2 |
| C | 31.9 (31.8 wt %) | | 53.1/ (53.0 wt %) | | | 15.0 (15.0 wt %) | 0.2 (0.2 wt %) | 100.2 |
| D | 63.8 (63.6 wt %) | | | 21.3 (21.2 wt %) | | 15.0 (15.0 wt %) | 0.2 (0.2 wt %) | 100.2 |
| E | 42.5 (42.4 wt %) | | | 42.5 (42.4 wt %) | | 15.0 (15.0 wt %) | 0.2 (0.2 wt %) | 100.2 |
| F | 31.9 (31.8 wt %) | | | 53.1 (53.0 wt %) | | 15.0 (15.0 wt %) | 0.2 (0.2 wt %) | 100.2 |
| G | 63.8 (63.6 wt %) | | | | 21.3 (21.2 wt %) | 15.0 (15.0 wt %) | 0.2 (0.2 wt %) | 100.2 |
| H | 42.5 (42.4 wt %) | | | | 42.5 (42.4 wt %) | 15.0 (15.0 wt %) | 0.2 (0.2 wt %) | 100.2 |
| I | 31.9 | | | | 53.1 (53.0 wt %) | 15.0 (15.0 wt %) | 0.2 (0.2 wt %) | 100.2 |
| 1 | | 63.8 (63.6 wt %) | 21.3 (21.3 wt %) | | | 15.0 (15.0 wt %) | 0.2 (0.2 wt %) | 100.3 |
| 2 | | 42.5 (42.4 wt %) | 42.5 | | | 15.0 (15.0 wt %) | 0.2 (0.2 wt %) | 100.2 |
| 3 | | 31.9 (31.8 wt %) | 53.1/ (53.0 wt %) | | | 15.0 (15.0 wt %) | 0.2 (0.2 wt %) | 100.2 |
| 4 | | 63.8 (63.6 wt %) | | 21.3 (21.2 wt %) | | 15.0 (15.0 wt %) | 0.2 (0.2 wt %) | 100.2 |
| 5 | | 42.5 (42.4 wt %) | | 42.5 (42.4 wt %) | | 15.0 (15.0 wt %) | 0.2 (0.2 wt %) | 100.2 |
| 6 | | 31.9 (31.8 wt %) | | 53.1 (53.0 wt %) | | 15.0 (15.0 wt %) | 0.2 (0.2 wt %) | 100.2 |
| 7 | | 63.8 (63.6 wt %) | | | 21.3 (21.2 wt %) | 15.0 (15.0 wt %) | 0.2 (0.2 wt %) | 100.2 |
| 8 | | 42.5 (42.4 wt %) | | | 42.5 (42.4 wt %) | 15.0 (15.0 wt %) | 0.2 (0.2 wt %) | 100.2 |
| 9 | | 31.9 (31.8 wt %) | | | 53.1 (53.0 wt %) | 15.0 (15.0 wt %) | 0.2 (0.2 wt %) | 100.2 |

*The wt % based on weight of the composition.

TABLE 2

Properties

| Ex. | Polymer | Filler Level wt %* | Filler Type | Tear Strength (lbf/in) | 10% Modulus (psi) | Strain @ break (%) | Stress @break (psi) | Shore A Hardness | DSC Hmelt (J/g) |
|---|---|---|---|---|---|---|---|---|---|
| A | P | 25.0 | TALC | 45.3 | 90.4 | 25.0 | 114.9 | | 41.2 |
| B | P | 50.0 | TALC | 36.6 | 147.6 | 17.8 | 168.5 | 45.6 | |
| C | P | 62.5 | TALC | 27.3 | 95.9 | 20.1 | 113.0 | | 28.2 |
| D | P | 25.0 | CACO3 | 34.2 | 78.4 | 42.4 | 120.6 | 48.8 | 38.5 |
| E | P | 50.0 | CACO3 | 52.7 | 99.1 | 49.9 | 130.2 | | |
| F | P | 62.5 | CACO3 | 40.0 | 93.7 | 45.2 | 101.7 | 39.2 | 27.3 |
| G | P | 25.0 | CFA | 25.5 | 75.7 | 39.8 | 111.6 | 46.1 | 36.3 |
| H | P | 50.0 | CFA | 48.8 | 85.6 | 33.5 | 120.7 | 34.8 | |
| I | P | 62.5 | CFA | 36.0 | 81.8 | 34.3 | 113.0 | 45.7 | 29.1 |
| 1 | MAH-P | 25.0 | TALC | 52.2 | 121.7 | 22.2 | 160.9 | | 34.4 |
| 2 | MAH-P | 50.0 | TALC | 63.7 | 171.4 | 18.3 | 199.6 | 55.4 | |
| 3 | MAH-P | 62.5 | TALC | 71.4 | 167.6 | 25.6 | 223.9 | | 25.7 |
| 4 | MAH-P | 25.0 | CACO3 | 51.4 | 98.5 | 51.6 | 183.0 | 51.9 | 37.2 |
| 5 | MAH-P | 50.0 | CACO3 | 72.4 | 127.5 | 49.5 | 198.4 | 51.9 | |
| 6 | MAH-P | 62.5 | CACO3 | 49.1 | 112.0 | 51.7 | 198.2 | 48.6 | 27.8 |
| 7 | MAH-P | 25.0 | CFA | 34.6 | 92.4 | 58.3 | 179.1 | 50.1 | 34.1 |
| 8 | MAH-P | 50.0 | CFA | 58.4 | 99.8 | 49.5 | 154.6 | 51.8 | |
| 9 | MAH-P | 62.5 | CFA | 56.5 | 107.0 | 71.0 | 189.6 | 51.6 | 25.1 |

*The wt % based on sum weight of polymer (P or MAH-P) plus filler.

TABLE 3

Properties

| Ex. | Polymer | Filler Level wt %* | Filler Type | DSC Tc (° C.) | DSC Tm (° C.) | DMS G' (23° C., ×10E6, Pa) | DMS Tan Delta (23° C.) | DMS Viscosity @100° C. (Pa · s, n*, 0.1 rad/s) | DMS Rheology Ratio @100° C. (V 0.1/V 100) |
|---|---|---|---|---|---|---|---|---|---|
| A | P | 25.0 | TALC | 49.5 | 65.2 | 4.2 | 0.22 | | |
| B | P | 50.0 | TALC | | | | | | |
| C | P | 62.5% | TALC | 46.4 | 61.2 | 6.3 | 0.24 | 388.6 | 2.3 |
| D | P | 25.0 | CACO3 | 51.6 | 66.2 | | | 92.0 | 1.3 |
| E | P | 50.0 | CACO3 | | | | | | |
| F | P | 62.5% | CACO3 | 49.0 | 64.8 | 4.2 | 0.25 | 295.3 | 3.2 |
| G | P | 25.0% | CFA | 50.6 | 65.1 | 2.7 | 0.19 | 76.3 | 1.1 |
| H | P | 50.0 | CFA | | | | | | |
| I | P | 62.5% | CFA | 49.2 | 64.7 | 2.7 | 0.24 | 113.8 | 1.4 |
| 1 | MAH-P | 25.0 | TALC | 49.2 | 64.4 | 3.9 | 0.15 | 2283.7 | 9.4 |
| 2 | MAH-P | 50.0 | TALC | | | | | | |
| 3 | MAH-P | 62.5% | TALC | 45.4 | 61.6 | 5.4 | 0.18 | 2716.0 | 6.7 |
| 4 | MAH-P | 25.0 | CACO3 | 48.3 | 64.7 | 2.9 | 0.15 | 1554.3 | 7.8 |
| 5 | MAH-P | 50.0 | CACO3 | | | | | | |
| 6 | MAH-P | 62.5% | CACO3 | 46.5 | 63.6 | 3.4 | 0.13 | 2086.4 | 8.2 |
| 7 | MAH-P | 25.0 | CFA | 48.3 | 64.8 | 5.3 | 0.15 | 1726.6 | 9.0 |
| 8 | MAH-P | 50.0 | CFA | | | | | | |
| 9 | MAH-P | 62.5% | CFA | 46.3 | 63.0 | 2.8 | 0.18 | 1919.9 | 9.1 |

*The wt % based on sum weight of polymer (P or MAH-P) plus filler.

As seen in Tables 1-3, the substitution of AFFINITY GA 1900 with AFFINITY GA 1000R results a significant improvement in physical properties of the compositions. It was discovered that, for the same filler type and filler loading, the inventive compositions (Examples 1-9) showed improvements in the following properties: Tear strength (+≥10%), 10% Modulus (+≥10%), Stress at Break (+≥10%), each over the respective comparative composition (Examples A-I). The Shore A hardness also increased for the inventive compositions.

It was also discovered that the inventive compositions showed improved solid phase elasticity, as indicated by the lower tan delta values from 0.13 to 0.18, as compared to values from 0.19 to 0.25 for the comparative compositions (DMS solid test method). It was also discovered that the inventive compositions had increased melt phase interaction, as indicated by a higher viscosity (V0.1 at 0.1 rad/s, 100° C.) for the inventive compositions (DMS melt test method). Also, the DMS (solid test method) tan delta, at 23° C., of the inventive compositions decreased, when compared to the respective comparative compositions. The observed improvement in these rheological properties suggests increased interaction and compatibility between the filler and the MAH-P of the inventive compositions. Also, the DMS (melt test method), V0.1/V100, ratio also significantly increased, indicating that viscosity of the inventive compositions, at high shear, decreases, which, in turn, indicates the inventive compositions should flow well at high shear rate. Thus the inventive compositions have the benefits of higher melt strength and good flow at high shear rates, which are desirable processing features.

Adhesion Testing

Each composition as shown in Table 4 below, was compression molded into a plaque, as discussed above. Each plaque was spray painted with a "SEM SURECOAT" waterborne paint, to form a painted plaque with a paint layer of around 1 mil in thickness. The painted surface and allowed to dry for 24 hours prior to testing. No other surface modification or cleaning was performed prior to the application of the paint.

Each painted plaque was analyzed by a standard crosshatch adhesion test. Crosshatch adhesion is a common industrial method for evaluating adhesion strength of a coating to a substrate. A crosshatch scribe is used to make parallel linear cuts through the surface coating. A similar set of linear cuts is made perpendicular to the original cuts, in order to obtain a checker board pattern. The total number of individual, scribed squares is 100. The surface area of the scribed surface was about "1 inch×1 inch."

A tape (Scotch Tape 3M #810) was applied to the scribed surface, and the tape-covered area was rubbed with fingers, in order to apply adequate pressure, ensuring intimate contact with the surface (approximate 50 g force). The painted plaque was allowed to sit for 10-30 seconds, and then the loose end of the tape was hand pulled, smoothly at an angle of about 135 degrees, to remove the tape from the surface. The coated surface was then visually evaluated for adhesion (ASTM D3359), and ranked using a numerical scaling, to provide an indication of the adhesion strength (or the adhesion between the paint and the substrate).

Poor adhesion was observed when a majority of the scribed squares peeled off with the tape. Excellent adhesion was observed when none (or few) of the scribed squares peeled off with the tape. The adhesion was ranked from 0B to 5B. Zero (0B) being the worst case (>65% of the area of the scribed squares fail (or peeled off with the tape)), and 5B being the best (0% of the area of the scribed squares fail (peeled off with the tape)). The results are reported in Table 4. As seen in Table 4, the inventive compositions, in general, have better adhesion than the comparative compositions. The inventive examples containing the filler and MAH-P resulted in a high paint adhesion rating. The examples containing only the P and filler, showed a poor adhesion rating. The results are significant since the inventive compositions have sufficiently low viscosity and better mechanical properties when compared to the comparative compositions (see Tables 2 and 3 above).

TABLE 4

Paint Adhesion Testing of the Inventive and Comparative Compositions

| Ex. (Composition) | 75 wt %* POLYMER | 25 wt %* Filler | +15 parts Additional Tackifier | Paint Adhesion Rating |
| --- | --- | --- | --- | --- |
| A | P | Talc | SU-125 | 0B |
| D | P | CaCO3 | SU-125 | 0B |
| G | P | Coal Fly Ash | SU-125 | 0B |
| 1 | MAH-P | Talc | SU-125 | 4B |
| 4 | MAH-P | CaCO3 | SU-125 | 3B |
| 7 | MAH-P | Coal Fly Ash | SU-125 | 3B |

*The wt % based on sum weight of polymer (P or MAH-P) plus filler.
5B: 100% area covered (with paint)/no adhesion failure; 4B: >95% to <100% area covered; 3B: >85% to 95% area covered; 2B: >65% to 85% area covered; 1B: >35% to 65% area covered 0B: <35% area covered (or ≥65% of painted surface peeled off with the tape).

Study 2

Inventive and comparative compositions are listed in Table 5, and composition properties are shown in Table 6. For each composition, the components were melt compounded, under a nitrogen purge, in a Laboratory HAAKE mixer (45 gram, small bowl) at a temperature of 150° C. Each composition was then compression molded, as discussed above, for further testing.

TABLE 5

Compositions (weight parts)

| Ex. | | Polymer(s) | P | MAH-P | CaCO$_3$ | SU-125 | IB225 | Total parts |
| --- | --- | --- | --- | --- | --- | --- | --- | --- |
| 10 | 5:1 First Comp. to Filler; MAH-P only | MAH-P | — | 70.9 (70.8 wt %*) | 14.1 | 15.0 (15.0 wt %*) | 0.2 | 100.2 |
| 11 | 1:5 First Comp. to Filler, MAH-P only | MAH-P | — | 14.1 | 70.9 | 15.0 | 0.2 | 100.2 |
| 12 | 5:1 First Comp. to Filler, 5:1 (P:MAH-P) | P and MAH-P | 59.1 | 11.8 | 14.1 | 15.0 | 0.2 | 100.2 |
| 13 | 1:5 First Comp. to Filler, 5:1 (P:MAH-P) | P and MAH-P | 11.8 | 2.4 | 70.9 | 15.0 | 0.2 | 100.2 |
| 14 | 1:1 First Comp. to Filler, 5:1 (P:MAH-P) | P and MAH-P | 35.4 | 7.1 | 42.5 | 15.0 | 0.2 | 100.2 |
| J | 0.6:1 First Comp. to Filler, P only | P | 37.5 | — | 62.5 | 0.0 | 0.2 | 100.2 |
| 15 | 0.6:1 First Comp. to Filler, MAH-P only | MAH-P | — | 37.5 | 62.5 | 0.0 | 0.2 | 100.2 |

*The wt % based on weight of the composition.

TABLE 6

Properties

| Ex. | Tear Strength (lbf/in) | 10% Modulus (psi) | Strain @ break (%) | Stress @ break (psi) | Shore A Hardness | DSC Hmelt (J/g) | DSC Tc (° C.) | DSC Tm (° C.) |
| --- | --- | --- | --- | --- | --- | --- | --- | --- |
| 10 | | 103 | 86 | 210 | 40 | 37.9 | 44.7 | 62.5 |
| 11 | 79.8 | 620 | 47 | 469 | 78 | 4.2 | 31.4 | 53 |
| 12 | 29.7 | 85 | 62 | 159 | 45 | 38.6 | 46.6 | 63.8 |
| 13 | 102.2 | 490 | 55 | 373 | 80 | 5.4 | 30.7 | 53.3 |

TABLE 6-continued

| | | | Properties | | | | | |
|---|---|---|---|---|---|---|---|---|
| Ex. | Tear Strength (lbf/in) | 10% Modulus (psi) | Strain @ break (%) | Stress @ break (psi) | Shore A Hardness | DSC Hmelt (J/g) | DSC Tc (° C.) | DSC Tm (° C.) |
| 14 | 34.3 | 114 | 69 | 169 | 25 | 22.8 | 45.3 | 61.6 |
| J | 31.5 | 127 | 11 | 212 | 70 | 20.7 | 54.7 | 69.2 |
| 15 | 54.1 | 354 | 21 | 423 | 74 | 17.8 | 50.4 | 65.9 |

As seen in Tables 5-6, the substitution of AFFINITY GA 1900 with AFFINITY GA 1000R resulted a significant improvement in physical properties of compositions (see inventive example 15 versus comparative example J). Compositions were tested up to approx. 71 wt % calcium carbonate and 15 wt % hydrocarbon tackifier. The inventive composition showed excellent mechanical properties: tear strength+30%, 10% modulus+100%, tensile strain @break+100%. Also, in addition to the improved mechanical properties, the Shore A of the inventive composition increased, when compared to the respective comparative composition. The observed improvement in properties suggests increased interaction and compatibility between the filler and the MAH-P of the inventive compositions.

It was also discovered that the mechanical properties of the inventive compositions dramatically improved with increasing filler amount from 5:1 to 1:5 (first composition to filler ratio; see Examples 10 and 11). For a constant first composition ("P:MAH-P" ratio of 5:1), it was observed that with increasing filler loading from 5:1 (first composition:filler) ratio to 1:5 (first composition:filler) ratio, the tear strength, and tensile modulus, and stress @break increased more than +100%. It was discovered that, for the compositions containing a fixed "P:MAH-P" ratio of 5:1 ratio (see Examples 12-14), the composition having a "first composition:filler" ratio of 1:5 (Example 13) resulted in the highest mechanical properties.

The invention claimed is:

1. An article comprising:
a paint layer having a thickness of about 1 mil in direct contact with a substrate, the substrate composed of a composition consisting of:
A) 65.2 wt % of a first polymer composition that is a maleic anhydride functionalized ethylene-based polymer;
B) 21.7 wt % of a filler selected from the group consisting of talc, calcium carbonate, and coal fly ash; and
C) 13.1 wt % of a tackifier that is a hydrocarbon tackifier;
wherein the anhydride functionalized ethylene-based polymer has a density from 0.855 g/cc to 0.900 g/cc and a melt viscosity, at 177° C., from 1,000 to 50,000 cP, and
wherein the article exhibits a paint adhesion rating of from 3B to 4B, as measured in accordance with the Crosshatch adhesion test.

2. An article comprising:
a paint layer in direct contact with a substrate, the substrate is a substrate composition consisting of:
A) from greater than or equal to 60 wt % to less than or equal to 75 wt % of a first polymer composition that is a maleic anhydride functionalized ethylene copolymer having a density from 0.855 g/cc to 0.900 g/cc and a melt viscosity, at 177° C., from greater than or equal to 5,000 cP to less than or equal to 20,000 cP;
B) a filler selected from the group consisting of talc, calcium carbonate, and coal fly ash; and
C) from 10 wt % to 16 wt % of a tackifier; and
the article exhibits a paint adhesion rating of from 3B to 4B, as measured in accordance with the Crosshatch adhesion test.

3. The article of claim 2 wherein the substrate composition has a stress at break from 154.6 psi to 223.9 psi.

4. The article of claim 2 wherein the substrate composition has a Shore A Hardness from 40.0 to 70.0.

5. The article of claim 2 wherein the substrate composition has a tear strength from 30 lbf/in to 200 lbf/in.

6. The article of claim 2, wherein the substrate composition has a Shore A Hardness from 20 to 80.

7. The article of claim 2, wherein the substrate composition has a 10% modulus from 110 to 700 psi.

8. The article of claim 2, wherein the substrate composition has a tear strength from 30 lbf/in to 200 lbf/in.

9. The article of claim 2, wherein the substrate composition has a stress at break from 169 psi to 470 psi.

10. The article of claim 2 wherein the substrate composition has a viscosity (V0.1 at 0.1 rad/s and 100° C.) from 1,000 to 3,000 Pa·s.

11. The article of claim 2 wherein the paint layer is an outermost layer.

12. The article of claim 11 wherein the maleic anhydride functionalized ethylene copolymer is a maleic functionalized ethylene/octene copolymer.

13. The article of claim 12 wherein the tackifier is a hydrocarbon tackifier.

14. The article of claim 13 wherein the paint layer has a thickness of about 1 mil.

* * * * *